3,201,690
WAVE TRANSIENT TIME INTERVAL MEASURING CIRCUIT WITH WAVE COMPARISON FUNCTION
Milton L. Embree, Laureldale, and Liber J. Montone, Reading, Pa.; said Embree assignor to Bell Telephone Laboratories, Incorporated, New York, N.Y., a corporation of New York, and said Montone assignor to Western Electric Company, Incorporated, New York, N.Y., a corporation of New York
Filed Mar. 9, 1960, Ser. No. 13,961
20 Claims. (Cl. 324—158)

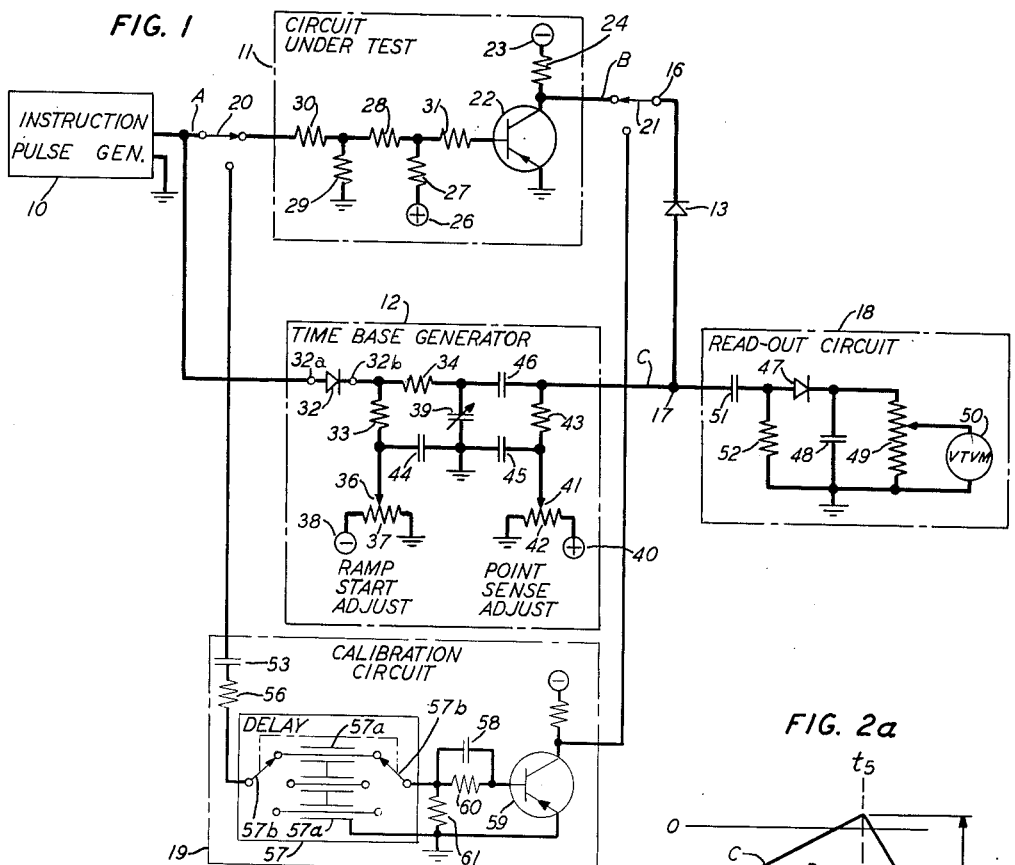
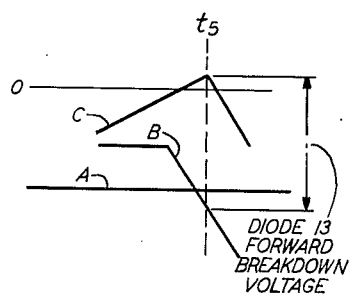
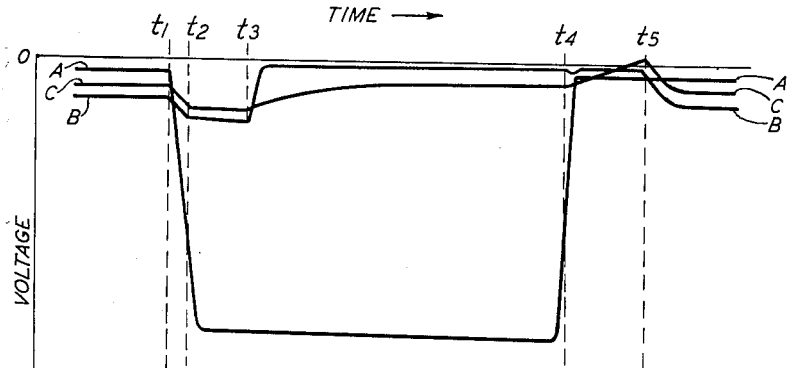

This invention relates to an arrangement for measuring short time intervals, and particularly intervals of millimicrosecond magnitudes, with the capability of discriminating fractions of a millimicrosecond.

For the purpose of explaining the principles of the invention a test set for measuring certain transistor switching times will be employed as an illustrative embodiment. Some of the time interval measuring problems associated with transistors will also be outlined to demonstrate certain of the outstanding advantages of the invention as compared to previously available measuring equipment.

In the present state of the art there are frequent demands for large numbers of transistors with the fastest possible switching time or for transistors which can meet specifications for a certain maximum switching time when driven by a specified signal. Sometimes the switching time of interest may be the full turn-on time or the full turn-off time of the transistor from the time that it is instructed to switch until the time that a swich has been completed. In other situations it is necessary to learn the time required for a transistor to pass through a certain percentage of the total change from a first condition to a second condition. For example, it may be necessary to measure one or more of the delay time, rise time, storage time, or fall time of a transistor. These are defined here for convenience as the respective times required after the application of an instruction pulse to a transistor control electrode for the output to change from OFF to 10 percent ON, from 10 percent ON to 90 percent ON, from full ON to 10 percent OFF, and from 10 percent OFF to 90 percent OFF. The term "ON" is used to indicate a substantial conduction condition and the term "OFF" is used to indicate a condition of substantially no conduction.

Time interval measuring equipment which may be easily operated by unskilled attendants and which is capable of employment for accurately measuring small time intervals required for fractional voltage changes to take place is not commercially available. The present solution to this problem in the industry is to employ the available measuring equipment with a measuring safety factor which is more than adequate to compensate for the inaccuracies in the measuring equipment. This necessarily results in discarding at the manufacturing level a significant percentage of the transistors tested, even though they have switching times that would meet specifications.

In one measuring problem it is necessary to measure the storage time of a transistor and this requires the determination of a voltage change of approximately $\%_0$ of a volt with respect to ground in an interval of perhaps ninety millimicroseconds. It is of course well known to actuate simultaneously a device under test and a time base circuit and then to measure the voltage output of the time base circuit when the test device has been completely actuated, the time base voltage being a measure of the actuation time. The arrangements in such systems for actuating and terminating the time base operation and for indicating the output voltage are usually incapable of accurately determining fractional voltage changes that take place in millimicrosecond time intervals because such intervals and voltage changes are much smaller than the time intervals and voltage changes required to operate the measuring circuit itself. These inherent inaccuracies make it difficult for skilled personnel to operate the equipment and almost impossible for unskilled factory personnel to operate the equipment.

In another known measuring scheme a switching transient is compared on the screen of an oscilloscope with a reference transient voltage waveform. The immediate difficulty presented by this method is that the scope trace has a finite width which, in terms of the time scale usually employed with such displays, corresponds to a considerable percentage of the duration of the switching time being measured. In addition, however, oscilloscope sweep frequencies are known to drift so much that rapid tests with a high degree of precision are practically impossible.

It is therefore one object of this invention to improve the accuracy of time interval measuring equipment for small time intervals.

It is another object of the invention to simplify time interval measuring equipment so that unskilled personnel may use such equipment rapidly and efficiently.

A further object is to simplify time interval measuring equipment so that it may be easily and inexpensively constructed for reliable and accurate operation.

In an illustrative embodiment of the invention a pulse generator supplies instruction pulses to a circuit under test and to a unique time base generator at the same time. The time base generator produces a ramp voltage which has a slope that is of the opposite polarity from the slope of the output voltage transient of the circuit under test. A comparator diode connected between the test device output terminal and an output terminal of the time base generator is poled to be normally nonconducting until after the ramp voltage exceeds the test transient by a predetermined amplitude. Conduction through the comparator diode causes a reversal in the slope of the ramp voltage, and a peak-reading voltmeter circuit indicates the maximum attained ramp voltage.

Separate time base generator controls are provided for adjusting the ramp starting voltage and for selecting the voltage on the test transient at which the comparator diode should become conducting. A capacitor in the time base generator resistance-capacitance circuit is calibrated in units of time and may be adjusted to change the slope of the ramp voltage to determine the exact time required for a test circuit to attain a selected transient voltage in response to an applied instruction pulse.

One feature of the circuit of the invention is that the comparator diode is normally nonconducting prior to the occurrence of the time interval which is to be measured so that its own relatively slow recovery time does not have an adverse effect upon the over-all measuring accuracy.

Another feature is that the above-described measuring arrangement can be operated on a go-no-go basis to determine whether or not a particular test device is within specification limits, or the circuit can be operated to measure accurately the elapsed transient time required to attain a selected transient condition.

The measuring accuracy of the circuit is a function of stable passive circuit elements rather than active transducers or voltage sources that valve variable conduction characteristics.

One particular arrangement to be described is also capable of being accurately responsive to a much smaller voltage than was heretofore possible with commercially available measuring equipment because of the particular manner in which the time base circuit cooperates with the comparator diode to free the system from interfering noise voltages.

The circuit of the invention may be readily modified for timing transients with negative slope or transients with positive slope.

A more complete understanding of the invention and of the objects and advantages thereof may be derived from a consideration of the following specification, including the appended claims, in connection with the attached drawings in which:

FIG. 1 is a schematic diagram of the circuit of the invention;

FIG. 2 includes a group of voltage wave diagrams illustrating the operation of the circuit of FIG. 1; and FIG. 2A is an enlarged diagram of a portion of FIG. 2.

An instruction pulse generator 10 in FIG. 1 drives a circuit 11 which is under test and a time base generator 12. The output of generator 10 is the voltage wave shown as wave A in FIG. 2. When measuring transistor storage time, the output of test circuit 11, wave B in FIG. 2, is at a first slightly negative level prior to time $t_4$; and in response to the voltage change in the instruction pulse at time $t_4$ the wave B changes to a second more negative level at time $t_5$. During this same time between $t_4$ and $t_5$ the time base generator 12 output, wave C in FIG. 2, has changed with a ramp configuration from a negative value at time $t_4$, which is more negative than either of the aforementioned levels of wave B, to a positive value at time $t_5$.

In accordance with the invention a comparator diode 13 is connected between a terminal 16 in the output of circuit 11 and a terminal 17 in the output of generator 12. Since diode 13 is poled for conduction from terminal 17 toward terminal 16 it is biased nonconducting at time $t_4$ and cannot conduct until time $t_5$ when wave C exceeds wave B by an amount which is equal to its forward breakdown voltage. Conduction in diode 13 causes a reversal of the slope of wave C at time $t_5$; and a peak-indicating readout circuit 18, which is responsive to positive-going voltage transients at terminal 17, indicates the peak value of the transient in a well-known manner. The output characteristics of time base generator 12 are known and can be precisely calibrated with aid of a calibration circuit 19, to be described, which can be inserted in the circuit by operating switches 20 and 21. The peak voltage reading at circuit 18 is a function of the time required for the test circuit 11 to change its output from the first level to the second level. One procedure for establishing the voltage-time relationship will subsequently be described.

It can be seen from FIGS. 2 and 2A that wave B changes through a small amplitude between times $t_4$ and $t_5$. During this same time interval wave C changes through a relatively much larger amplitude. Diode 13 requires a forward bias potential difference which is also much larger than the sweep of wave B; but because this diode is subjected to the sweeps of both wave B and wave C, and because wave C sweeps through a relatively large amplitude and has a different direct current reference during the time interval to be measured, diode 13 can be utilized to detect a transient voltage point representing a voltage change that is much smaller than its own forward breakdown voltage.

As suggested above, the manner in which time base generator 12 cooperates with comparator diode 13 contributes significantly to the improved measuring accuracy as compared to prior art circuits. This cooperation will become apparent in the more detailed description of certain aspects of the invention which follows.

Generator 10 produces a train of output pulses of sharp rectangular configuration with a duty cycle of approximately 15 percent to minimize temperature effects in the transistor under test. This pulse train is advantageously produced by differentiating the output from a multivibrator and shaping the differentiated pulses of one polarity in one or more overdriven amplifier circuits.

Test circuit 11 may be any "black box" that is characterized by an output voltage that changes from a first level to a second level in response to the application of a signal to the output thereof. In FIG. 1, the circuit 11 includes a PNP transistor 22 arranged in a common emitter configuration with operating potentials supplied from grounded potential sources schematically represented by the circled minus and plus signs 23 and 26, respectively. A resistor 24 is connected in the collector circuit of transistor 22. Potential dividing resistors 27, 28, and 29 connected to source 26 establish a normally nonconducting bias on the base electrode of transistor 22. Series connected resistors 30 and 31 are provided to fix a predetermined base driving current level. This base circuitry for transistor 22 could of course be simplified, but it is illustrated as one configuration that was employed to meet particular test specifications for a storage time measurement.

Prior to time $t_1$ an input gating diode 32 in time base generator 12 is ON, and the output of generator 10 is applied to terminal 32a of that diode. Current flows from pulse generator 10 through a resistor 33 to a tap 36 on potential divider 37 which is across the terminal of a source of negative potential schematically represented by the circled minus sign 38. A calibrated variable capacitor 39, arranged in an integrating type of circuit, is charged to the negative potential difference between terminal 32b of diode 32 and ground. A source 40 of positive potential supplies current through a tap 41 on a potentiometer 42, a resistor 43, comparator diode 13, and resistor 24 to the negative source 23 in the circuit 11 under test. Resistors 24 and 43 are proportioned so that terminal 17 is at a steady stage negative voltage before time $t_1$ as indicated on wave C in FIG. 2. Tap 41 may be adjusted, however, to change the level of the voltage at terminal 17 prior to time $t_1$. A coupling capacitor 46 charges toward the potential difference between terminal 17 and terminal 32b of diode 32, but the change in potential difference across it is negligible because its charging circuit has a time constant which is much larger than the period of the pulse generator 10. Capacitor 46 is included in the circuit to simplify point sense adjustments at relatively low instruction pulse repetition rates, and for operation at high rates it may be considered to be a short circuit for current components other than direct current.

At time $t_1$ the negative-going instruction pulse starts, and the voltage impulse representing its leading edge starts to drive transistor 22 into saturated conduction and begins to bias diode 32 OFF. Capacitor 39 charges to a more negative voltage because of the reduced potential difference across resistor 33. The negative-going potential at the ungrounded terminal of capacitor 39 is coupled to terminal 17 as indicated in wave C between times $t_1$ and $t_2$, and it causes a corresponding reduction in the current through diode 13 which permits wave B to become more negative also.

At time $t_2$ diode 32 is biased OFF completely, and thereafter capacitor 39 continues to charge negatively at a slower rate. At time $t_3$ comparator diode 13 is biased OFF by the positive-going potential at terminal 16 due to transistor 22 reaching its saturated conduction condition. The voltage C at terminal 17 now begins to swing in a positive direction as capacitor 39 charges toward a potential established by the voltage divider action of resistors 33, 34, and 43, considering coupling capacitor 46 to be a short circuit as previously noted. However, prior to time $t_4$ wave C has attained an essentially quiescent value.

Bypass capacitors 44 and 45 between ground and taps 36 and 41, respectively, serve to shunt varying components of current around potentiometers 37 and 42. This reduces to a minimum any changes in potential at those taps.

Just prior to time $t_4$ transistor 22 is conducting at its saturated level, diode 13 is OFF, diode 32 is OFF, and time base generator 12 is in a state of readiness for ramp generation. At time $t_4$ the instruction pulse is terminated and the voltage at the output of generator 10 is reduced to a small negative value. This positive-going impulse instructs transistor 22 to begin turning off and instructs generator 12 to start operating in order that storage time may be measured. Diode 32 is biased ON at time $t_4$. Current from generator 10 flowing through resistor 33 produces a potential difference which begins to reduce the negative charge on capacitor 39 and causes a positive-going ramp voltage to be coupled to terminal 17.

At time $t_4$ the instruction pulse is received at transistor 22 and turn-off begins. The dimple in wave B just after time $t_4$ is believed to be due to the differentiating effect of stray capacities and does not represent a significant change in conduction in transistor 22. Stored minority carriers maintain conduction in transistor 22, and the collector voltage of transistor 22 remains substantially constant for a significant interval after time $t_4$. The positive-going ramp potential at terminal 17 is coupled through capacitor 51 and a potential difference is developed across readout resistor 52 in the readout circuit 18. Diode 47 is biased into conduction and supplies current to charge capacitor 48 and develop a potential difference across potential divider 49.

At some time between the times $t_4$ and $t_5$ waves B and C intersect indicating that the ramp voltage and the output transient voltage from test circuit 11 are equal, but there is insufficient potential difference to bias diode 13 into conduction until the ramp voltage wave C has attained a positive value at time $t_5$. At some time before time $t_5$ the stored minority carriers in transistor 22 are no longer present and the collector voltage begins to change in a negative direction. At time $t_5$ the wave C is more positive than wave B by an amount which equals the forward breakdown voltage of diode 13, and this diode is biased into conduction as previously described. The conduction through diode 13 from terminal 17 prevents further increase in the ramp output voltage from generator 12 and causes a reversal of the slope of the ramp thereby coupling a negative potential to readout circuit 18 to bias diode 47 OFF. The voltage wave C now continues to change in a negative direction with approximately the same configuration as wave B until both have stabilized at their initial values.

It is significant to note at this stage that when turn-off bias was applied to diode 32 at time $t_1$ a substantial time was required to complete the change from the conducting condition to the nonconducting condition as indicated between times $t_1$ and $t_2$ in FIG. 2. However, it is apparent that when this diode was biased ON once more at time $t_4$ the transition was almost instantaneous. Such operation is characteristic of semiconductor diodes, and is used to advantage in the case of diode 13 as well as diode 32. In the case of diode 32, it was biased ON at time $t_4$ and permitted the ramp voltage to start at precisely the correct moment. In the case of comparator diode 13 it was biased ON at exactly the time when the potential difference between its terminals equalled its known forward breakdown voltage so that the ramp peak was accurately indicative of the time required for wave C to reach a certain transient point.

Although the wave diagrams in FIG. 2 are not intended to be drawn to scale, they are roughly indicative of the actual situation as borne out by operating measurements.

Subsequent repetitions of the above-described operating cycle of the measuring apparatus at a kilocycle rate maintain capacitor 48 charged at a peak potential level which is indicative of the time required for transistor 22 to change its output voltage by a predetermined amount after receiving an instruction pulse. Meter 50 tends to indicate the peak value of the positive-going swing in wave C with reference to the average value of voltage at terminal 17, and that average value differs from the quiescent value of voltage at terminal 17 just prior to time $t_4$ by a determinable small amount. Duty cycle and repetition rate of the instruction pulse generator 10 are chosen so that there are only negligible variations in the average value of wave C due to other factors. As a result, the meter 50 may be easily calibrated to read the peak value with respect to ground of the positive-going voltage excursion which takes place after time $t_4$. Any error that might result from small variations in the width of the pulse in wave A would cause only a small error in the absolute magnitude of wave C at time $t_4$, an error which has been found by correlation of calculated and measured results to be negligible because of the comparatively large excursion in wave C between times $t_4$ and $t_5$.

In FIG. 2A the critical portions of the wave diagrams of FIG. 2 for storage time measurements are shown in enlarged form. It is clear in this figure that while the wave C is increasing with positive slope just before time $t_5$ the wave B is decreasing with negative slope. At time $t_5$ the two waves have diverged sufficiently to bias comparator diode 13 into conduction.

Time base generator 12 includes some adjustments that make it extremely flexible so that one may take maximum advantage of the circuit features already described. Tap 36 may be changed to provide a ramp start adjustment which determines the level of wave A at which the time base generator is instructed to start the ramp. This adjustment is useful when the instruction pulses have significant sloping edges.

Tap 41 may be adjusted to change the point on transient voltage wave B at which diode 13 will conduct to terminate the positive-going portion of the ramp wave C. A change in the potential at the point sense tap 41 alters the direct current reference level of wave C and thus controls the value of ramp wave C at time $t_4$. If tap 41 is moved to a more positive potential than that shown in FIG. 1, the potential of wave C at time $t_4$ increases to a more positive voltage. Since a change in voltage at tap 41 does not change the time constant of the charging circuit for capacitor 39, no change has been made in the ramp voltage slope between times $t_4$ and $t_5$, but that portion of wave C has been moved positively. Wave B then decreases by a smaller amount before diode 13 will be biased into conduction. Thus, the time interval from $t_4$ to $t_5$ is decreased. Similarly, by changing tap 41 to a more negative voltage a larger drop will be detected in wave B prior to conduction in diode 13, and the interval between times $t_4$ and $t_5$ will be extended.

The exact setting for the point sense adjustment tap 41 may be determined once the specifications for the circuit under test are known. If it is desired to measure the storage time, then the point at which the output transient has fallen 10 percent of the full transient swing is of interest. It is known that the wave C voltage with respect to ground at the 10 percent point is equal to the algebraic sum of the transistor collector voltage at saturation, plus a voltage coresponding to 10 percent of the total voltage excursion from the saturation condition to the OFF condition, and plus the known forward breakdown voltage of comparator diode 13. The result is the peak voltage wtih respect to ground to which terminal 17 must be driven by the output of time base generator 12 in order to measure the transistor storage time. The circuit adjustments required to cause wave C to be limited at the proper voltage, and to produce on meter 50 an indication that wave C has been so limited, may be performed in any way that is convenient for a particular measuring situation. In one arrangement it was found to be convenient to display on an oscilloscope the voltage with respect to ground at terminal 17 and to adjust tap 41 until the peak of wave C was equal to the limiting value calculated as hereinbefore noted. The tap on divider 49 is then adjusted until that same peak voltage is indicated on meter 50.

An adjustment of capacitor 39 in time base generator 12 changes the slope of the ramp wave C because it changes the time constant of the circuit including capacitor 39, and the parallel combination of resistor 43 in shunt with the series combination of resistor 34, diode 32, and the source impedance of generator 10. Capacitor 39 may be calibrated, as will be subsequently described, to indicate units of time. Thus, if it is desired to know the elapsed time required for a test circuit output voltage transient to reach a certain level it is necessary only to vary the ramp slope by adjusting calibrated capacitor 39 until the meter 50 indicates a peak voltage of wave C corresponding to the mentioned certain level of the transient. The desired meter indication must, of course, be determined as previously described in connection with the point sense adjustment. The time sought may then be read directly from the calibrated dial of capacitor 39.

In certain factory installations it is convenient to check transistors on a go-no-go basis. For this purpose the point sense adjustment is set as previously described for the desired point on the transient to be measured. Capacitor 39 is set for the maximum allowable time for the transient to reach that point. Then if during a test the meter 50 shows a voltage which is larger than the predetermined indication for the desired transient point, it is known that the transistor under test is switching too slowly. If the meter 50 indicates a voltage which is smaller than the predetermined indication it is known that the transistor under test has a satisfactory switching time.

In order to calibrate the measuring apparatus of FIG. 1, switches 20 and 21 are operated to connect calibration circuit 19 into the system in substitution for test circuit 11. Circuit 19 is similar to the illustrated test circuit 11 with certain modifications to permit the attainment of different known switching times between the application of an instruction pulse to the input of circuit 19 and the switching of the output voltage therefrom. A capacitor 53 is connected in series in the input for direct current isolation. A resistor 56 provides some current limiting.

An adjustable delay line 57 is also connected in series in the input of circuit 19 and includes a number of sections 57a of coaxial cable with known propagation delay characteristics. Appropriate switches 57b are also included in delay line 57 for connecting different lengths of cable in the calibration circuit. A speed-up coupling capacitor 58 is provided in series between the output of delay line 57 and the calibration circuit transistor 59 to increase the effectiveness of driving pulses applied to transistor 59 and thereby speed up the switching time of transistor 59 to a constant short time. Resistor 60 provides further current limitation to prevent transistor 59 from being driven into excessive saturation. A shunt-connected resistor 61 terminates delay line 57.

With a constant transistor switching time in circuit 19, it is necessary to add enough sections of coaxial cable to provide a desired delay. The dial of capacitor 39 may be accurately calibrated by inserting sufficient delay in circuit 19 to provide an equivalent switching time corresponding to an intended major scale mark on the calibration scale of capacitor 39. Capacitor 39 is adjusted until a voltage reading is obtained on meter 50 which corresponds to the desired switched output voltage of transistor 59. The dial of capacitor 39 is then appropriately marked. A new set of cable sections is switched into delay line 57 to provide delays corresponding to other intended scale markings for capacitor 39 and the operation repeated. This calibration procedure may be followed easily by unskilled personnel and has been found to be so convenient that an attendant can easily check the calibration of the equipment at any time.

In normal operation an unskilled attendant may have available for his operation the switches 21 and 20, a knob for adjusting delay line 57 and a knob for adjusting capacitor 39. The ramp start adjustment and the point sense adjustment would generally be preset and locked by skilled personnel to meet specification requirements for a certain job to be performed.

A time interval measuring system constructed along the lines herein described would generally employ a regulated direct voltage source to supply the various operating potentials. The principal source of error remaining is the usual drift in meter 50, which is usually a vacuum tube voltmeter. However, the accuracy and simplicity of the calibration arrangement make it a simple matter for the unskilled attendant to correct the meter at any time during operation.

It will at once be apparent to those skilled in the art that this apparatus may be easily modified by replacing meter 50 with a servo network that would automatically adjust capacitor 39 to attain a predetermined peak voltage level in the readout circuit.

A change from the measurement of transistor turn-off characteristics to the measurement of transistor turn-on characteristics may be accomplished by simply reversing diodes 13, 32 and 47. These changes would cause some obvious alterations in the waves B and C, but otherwise the circuit operation would be essentially identical to that here described and would measure the elapsed time from $t_1$ until a predetermined point on the transistor turn-on transient output had been attained. All of the described features and advantages of the circuit would remain, and it would not be necessary to insert any additional circuit elements to accomplish such a change.

While the invention has been described with reference to a particular embodiment thereof and certain obvious modifications have been suggested, it is of course intended that many other variations on applications of the invention and means for carrying the invention into realization which will be apparent to those skilled in the art are included within the scope of the invention.

What is claimed is:

1. A time interval measuring circuit comprising a circuit under test which produces an output voltage that changes between a first output voltage level and a second output voltage level in response to an input signal, means producing a timing wave having a predetermined amplitude variation, means simultaneously applying an input signal to said circuit under test and to said producing means, a diode connected between the output of said circuit under test and the output of said producing means, said diode being poled to conduct in response to the attainment of one of said levels at said test circuit output for limiting said amplitude variation, and means connected to one electrode of said diode for indicating the peak amplitude attained by the wave in the output of said producing means.

2. A time interval measuring circuit comprising a circuit under test which produces an output voltage that changes between a first output voltage level and a second output voltage level in response to an input signal, a time base wave generator, means simultaneously applying an input signal to said circuit under test and to said generator, said signal including first and second portions, a gate diode in said generator and connected in series between said signal applying means and said generator, said gate diode being biased for conduction by said first portion of said signal, a source of bias potential in said generator tending to bias said gate diode OFF in response to said second portion of said signal, a further diode connected between the output of said circuit under test and the output of said generator, said further diode being poled to be normally nonconducting prior to the attainment of one of said levels of said test circuit output, adjustable resistance means in said generator connecting said bias source to said gate diode for varying the relative durations of said portions with respect to one another, and means connected to one electrode of said further diode for indicating the peak amplitude attained by the wave in the output of said generator.

3. A time interval measuring circuit comprising a circuit under test produces an output voltage that changes between a first output voltage level and a second output voltage level in response to an input signal, a time base wave generator, means simultaneously applying an input signal to said circuit under test and to said generator, said generator comprising an adjustable capacitor for varying the slope of a portion of said wave, means charging said capacitor, and means responsive to a portion of said signal changing the charge condition of said capacitor, a diode connected between the output of said circuit under test and the output of said generator, said diode being poled to be normally conducting prior to the attainment of one of said levels at said test circuit output, and means connected to one electrode of said diode for indicating the peak amplitude attained by the wave in the output of said generator.

4. The time interval measuring circuit in accordance with claim 3 which comprises in addition a calibration circuit including a variable delay line, a transistor connected in the common emitter configuration, and a capacitor connecting the output of said delay line to the base electrode of said transistor, said measuring circuit further comprising switching means, and means including said switching means for selectably connecting either said calibration circuit or said test circuit in said time interval measuring circuit.

5. In a system for measuring the elapsed time required for a voltage transient to be changed from a first voltage level to a second voltage level in response to a voltage impulse, said transient having slope of known sign, and wherein the transient is compared with a known voltage waveform including said second level, the improvement which comprises means generating said waveform with a slope of opposite sign from the slope of said transient, a diode means applying said transient and said waveform to different terminals of said diode, respectively, said diode being poled to conduct in response to the attainment of said second level for limiting said waveform, and means indicating the amplitude of said waveform in response to conduction in said diode.

6. In a system for measuring the elapsed time for a voltage transient to change from a first level to a second level in response to an instruction pulse in the output of a pulse source and wherein the transient is compared with the output of an adjustable generator producing a known voltage waveform including said second level, the improvement which comprises means for calibrating said generator and comprising a transistor connected in the common emitter configuration, an adjustable delay line, a speed-up capacitor connecting the output of said delay line to the input of said transistor, and means connecting said calibration means with said instruction pulse source and said generator to simulate transients with different known times for response to instruction pulses.

7. The measuring system in accordance with claim 6 in which said delay line comprises a plurality of sections of coaxial cable of known delay characteristics, and means selectably connecting different combinations of said sections into said calibrating means.

8. A test circuit for measuring the response time of a transistor comprising base, collector, and emitter terminals and connected in a common emitter configuration, said circuit comprising a pulse source, means connecting said pulse source to said base terminal, a timing capacitor, means for charging said timing capacitor, a first diode connecting said timing capacitor to said collector terminal, a peak reading detector circuit including a second capacitor, and a second diode connecting said timing capacitor to said second capacitor.

9. A time interval measuring circuit comprising a circuit under test which produces an output voltage that changes between first and second levels in response to an input voltage impulse, a source of voltage impulses, means producing a timing wave having a predetermined amplitude variation, means applying each of said impulses to said test circuit and to said producing means, a diode connected between the output of said circuit under test and the output of said producing means for limiting excursions of one polarity of the timing wave, and means connected to one electrode of said diode for indicating the peak amplitude attained by said wave.

10. A time interval measuring circuit in accordance with claim 9 in which said producing means comprises means adjustably biasing said diode for limiting excursions of said wave to different amplitudes corresponding to different values of said second level.

11. A test circuit for measuring the response time of a transistor having a base, a collector, and an emitter, said circuit comprising a pulse source, timing means, circuit means connecting said timing means and said transistor to said pulse source, said circuit means responsive to pulses from said source to switch the state of conduction of said transistor from a first state to a second state and to initiate the timing action of said timing means, means interconnecting said timing means and said transistor for terminating the timing action of said timing means, and means for determining the potential at the collector of said transistor when said timing action is terminated.

12. A test circuit in accordance with claim 11 wherein said timing means is adjustable to select a point in time at which said timing action is terminated.

13. A test circuit in accordance with claim 12 wherein said timing means includes means for generating a signal representative of the elapsed time between the initiation and termination of said timing action.

14. A test circuit in accordance with claim 11 wherein said pulse source generates pulses which have a rise time substantially shorter than the response times of said transistor and wherein the period between said pulses is sufficient to permit said transistor to return to said first state.

15. A test circuit in accordance with claim 11 wherein said timing means comprises an integrating circuit, said integrating circuit including a source of potential, resistive means, a capacitor, and means connecting said potential source and said resistive means to said capacitor for changing the charge on said capacitor in a predetermined manner with respect to time in response to each of said pulses.

16. A test circuit in accordance with claim 15 wherein said timing means further comprises a detector for determining the peak charge accumulated by said capacitor, said peak charge being representative of the elapsed time between the initiation and termination of the timing action of said timing means.

17. A test circuit for measuring the switching characteristics of a transistor having a base, a collector, and an emitter, said test circuit comprising means connecting said transistor in the common emitter configuration, a variable integrating network including a resistor and a capacitor, a peak-reading detector connected to one terminal of said capacitor, a pulse source, means connecting said pulse source to said transistor and to said integrating network the last-mentioned means being responsive to pulses from said pulse source to simultaneously initiate an operation of said transistor and initiate charging of said capacitor, and gating means connecting said capacitor and said collector of said transistor for discharging said capacitor when the potential across said capacitor exceeds the potential at said collector of said transistor by a predetermined amount.

18. In a time interval measuring circuit, a test circuit which is characterized by a transient output voltage variation within a predetermined amplitude range during a time interval to be measured, said voltage variation being produced in response to the application of an input voltage at the beginning of said interval, means generating a wave of variable voltage sweeping through an amplitude range much greater than the amplitude range of said transient within said time interval, means applying said input voltage simultaneously to said test circuit and to said generating means, means limiting the amplitude sweep of said wave in response to the attainment by said transient voltage of a limit of its predetermined range, the last-mentioned means comprising a diode connected between the outputs of said test circuit and of said generating means, said diode poled to be normally non-conducting prior to the end of said interval, and means indicating the peak attained amplitude of said wave.

19. In a time interval measuring system wherein a circuit under test and a time base waveform generator are driven in multiple from a signal source to determine the time required for the output of said circuit to change from a first predetermined level to a second predetermined level in response to an impulse from said source, a comparator diode connected between the outputs of said circuit and said generator, and means in said generator establishing a direct potential reference for said waveform whereby the output potentials from said circuit and said generator differ by the amount of the forward breakdown voltage of said diode when said circuit output is at said second level.

20. A time interval measuring circuit comprising a test device characterized by an output voltage change with no significant slope reversals during a time interval of interest, means responsive to an applied signal for generating a timing wave of predetermined configuration, means simultaneously applying a signal to said test device and to said generating means for initiating the operation of both said device and said generating means thereby initiating said time interval, means connected to the outputs of said test device and said generating means, and including said test device, limiting the peak excursion of said timing wave to terminate said interval in response to the attainment of a predetermined voltage level in said voltage change, and means indicating the voltage magnitude of the peak excursion of said timing wave.

References Cited by the Examiner

UNITED STATES PATENTS

| | | | |
|---|---|---|---|
| Re. 24,446 | 3/58 | Summers | 324—68 X |
| 2,623,106 | 12/52 | Fassberg | 324—68 |
| 2,851,596 | 9/58 | Hilton | 324—68 X |
| 2,965,843 | 12/60 | Sterk | 324—68 |
| 3,007,113 | 10/61 | Kreinberg | 324—158 |
| 3,074,017 | 1/63 | Sunstein et al. | 324—158 |

OTHER REFERENCES

"Electronic Design," May 14, 1958, "Billionth Second Timer."

WALTER L. CARLSON, *Primary Examiner.*

LLOYD McCOLLUM, SAMUEL BERNSTEIN,
*Examiners.*